United States Patent
Hitomi et al.

(10) Patent No.: US 7,523,881 B2
(45) Date of Patent: Apr. 28, 2009

(54) FISHING REEL, FISHING INFORMATION DISPLAY DEVICE, AND FISHING INFORMATION DISPLAY SYSTEM

(75) Inventors: Yasuhiro Hitomi, Sakai (JP); Noboru Sakaguchi, Sakai (JP); Yoshiyuki Furomoto, Sakai (JP); Hiroaki Kuriyama, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/497,286

(22) Filed: Aug. 2, 2006

(65) Prior Publication Data

US 2006/0266860 A1    Nov. 30, 2006

Related U.S. Application Data

(62) Division of application No. 10/674,067, filed on Sep. 30, 2003, now Pat. No. 7,108,213.

(30) Foreign Application Priority Data

| Sep. 30, 2002 | (JP) | ............................. 2002-285587 |
| Sep. 30, 2002 | (JP) | ............................. 2002-285588 |
| Apr. 4, 2003 | (JP) | ............................. 2003-101425 |

(51) Int. Cl.
*A01K 89/01* (2006.01)

(52) U.S. Cl. ............................. 242/223; 242/323; 43/20

(58) Field of Classification Search .............. 242/223, 242/250, 257, 305, 322, 323, 309; 33/713, 33/715, 719, 720, 732, 733; 43/4, 20

See application file for complete search history.

(56) References Cited

U.S. PATENT DOCUMENTS

| 4,445,178 | A | * | 4/1984 | Scheer et al. ................. 700/90 |
| 4,697,758 | A | * | 10/1987 | Hirose et al. ................. 242/223 |
| 4,752,878 | A | * | 6/1988 | Sigurdsson et al. ........... 43/4.5 |
| 5,007,601 | A | * | 4/1991 | Emura et al. ................. 242/223 |
| 5,236,147 | A | * | 8/1993 | Kaneko ....................... 242/223 |
| 5,363,565 | A | * | 11/1994 | Kaneko ........................ 33/719 |
| 5,395,065 | A | * | 3/1995 | Hirose ......................... 242/223 |
| 5,503,341 | A | * | 4/1996 | Kaneko et al. .............. 242/223 |
| 5,553,940 | A | * | 9/1996 | Nishihara .................... 374/136 |
| 5,782,003 | A | * | 7/1998 | Bozzo ......................... 33/291 |
| 5,782,033 | A | | 7/1998 | Park |

(Continued)

FOREIGN PATENT DOCUMENTS

JP        05-196732 A      8/1993

(Continued)

*Primary Examiner*—Emmanuel M Marcelo
(74) *Attorney, Agent, or Firm*—Shinjyu Global IP

(57) ABSTRACT

An electric reel is furnished with an information communication unit is adapted for transmitting first information concerning the reel to an external fishing information display device. The information communication unit is adapted for receiving second information concerning fishing from a fish finder or a GPS through a fishing information display device and an information coordinating unit. A second display unit of the fishing information display device can display the first information concerning the reel obtained from the reel and the second information concerning fishing with one of the first and second information being superimposed on the other. In this fishing reel, a large amount of information can be displayed while the size of the reel is kept small. Also, information concerning fishing can be obtained quickly.

8 Claims, 11 Drawing Sheets

U.S. PATENT DOCUMENTS

| | | |
|---|---|---|
| 5,833,154 A | 11/1998 | Kaneko |
| 5,883,154 A * | 3/1999 | Kappock et al. ............. 523/122 |
| 6,053,443 A * | 4/2000 | Nanbu et al. ................. 242/223 |
| 6,056,218 A * | 5/2000 | Nanbu ......................... 242/223 |
| 6,126,103 A * | 10/2000 | Nanbu ......................... 242/223 |
| 2002/0053617 A1* | 5/2002 | Nanbu ......................... 242/223 |
| 2005/0162976 A1 | 7/2005 | Kuriyama |
| 2005/0218256 A1 | 10/2005 | Ikuta |

FOREIGN PATENT DOCUMENTS

| | | | |
|---|---|---|---|
| JP | 2001-057834 A | | 3/2001 |
| JP | 2002-027878 A | * | 1/2002 |
| JP | 2002-125545 A | | 5/2002 |
| JP | 2002-233284 A | | 8/2002 |
| JP | 2002-247940 A | * | 9/2002 |
| JP | 2002-262739 A | | 9/2002 |

* cited by examiner

FISHING REEL, FISHING INFORMATION DISPLAY DEVICE, AND FISHING INFORMATION DISPLAY SYSTEM

CROSS-REFERENCE TO RELATED APPLICATIONS

This application is a divisional application of U.S. patent application Ser. No. 10/674,067 filed on Sep. 30, 2003. The entire disclosure of U.S. patent application Ser. No. 10/674,067 is hereby incorporated herein by reference.

BACKGROUND OF THE INVENTION

1. Field of the Invention

The present invention relates to fishing reels, fishing information display devices, and fishing information display systems. More particularly, the invention relates to a fishing reel storing first information on the reel internally, as well as a fishing information display device and a fishing information display system for displaying the first information and second information.

2. Background Information

A fishing reel is generally furnished with a reel body; a spool mounted to the reel body; a handle for rotating the spool; a counter case mounted above the reel body; and a display device provided on the upper surface of the counter case and including a display unit for displaying water depth. The display unit is, for example, a liquid crystal display and is capable of displaying first information concerning the reel, such as fish zone and current water depth of terminal tackle.

A fishing boat is generally equipped with an information collecting device, such as a fish finder and a global positioning system (GPS), that is adapted for collecting second information concerning fishing. The information collecting device of this kind is provided with a display unit adapted for displaying the second information, as disclosed in Japanese Laid-Open Patent Application Publication No. 2002-142623. The information collecting device of this kind is often disposed at a location distant from the angler. For this reason, the information displayed on the display unit, which relates to fishing, is conveyed verbally from a boatman to the angler.

The foregoing fishing reel equipped with the conventional display device displays first information on a display unit in the counter case. In recent years, however, the amount of the first information concerning the reel has increased so that it has become difficult to display all the information on the display unit. In view of this problem, it is conceivable that the size of the display unit itself is increased in the arrangement, but this can cause an increase in the size of the reel. If the size of the reel is increased, "palming" or holding the reel becomes difficult.

Meanwhile, the foregoing conventional information collecting device is provided with the display unit, so that the second information can be obtained. However, since the information collecting device is disposed at a location distant from the angler, the angler is offered the second information, for example, verbally from the boatman, which makes it difficult to obtain the second information on a real-time basis.

In view of the above, there exists a need for fishing reels which overcome the above mentioned problems in the prior art. This invention addresses this need in the prior art as well as other needs, which will become apparent to those skilled in the art from this disclosure.

SUMMARY OF THE INVENTION

It is therefore a purpose of the present invention to provide a fishing reel that can display a large amount of information while the size of the reel is kept small.

It is another purpose of the invention to more quickly obtain the information concerning fishing obtained from the information collecting means provided on a fishing boat.

It is still another purpose of the present invention to improve operability of the fishing reel, the fishing information display device used for the reel, and the fishing information display system in various operations.

The fishing reel according to a first aspect of the present invention is a fishing reel in which first information concerning the reel is internally stored, and which is adapted to be operatively connected to a fishing information display device. The fishing reel includes: a reel body; a line-winding spool rotatably mounted to the reel body; storing means for storing the first information; and output means for outputting the first information stored in the storing means to the fishing information display device.

The fishing reel has the output means for outputting the first information concerning the reel to the fishing information display device. Therefore, by providing, separately from the reel, a fishing information display device that is capable of displaying the first information, a large amount of information can be displayed while the size of the reel is kept small.

The fishing reel according to a second aspect of the invention is the fishing reel according to the first aspect, which further includes a first display unit mounted in the reel body for displaying at least the first information; and first display means for enabling the first information stored in the storing means to be displayed on the first display unit. In this case, provision of the first display unit for, for example, a hand-winding counter reel or an electric reel enables a still larger amount of information to be displayed.

The fishing reel according to a third aspect of the invention is the fishing reel according to the second aspect, further including water depth measuring means for measuring water depth of a terminal tackle that is attached to a fishing line wound around the spool. The first information includes the water depth measured by the water depth measuring means. In this case, the water depth measured by the water depth measuring means can be displayed as the first information on the first display unit.

The fishing reel according to a fourth aspect of the invention is the fishing reel according to any of the first through third aspects, in which the first display means in displaying switches between a detail mode in which the first information is displayed on the first display unit in a detailed manner, and a simple mode in which the first information is displayed on the first display unit in a simplified manner. In this case, display that suits angler's preference is possible by switching between the detail mode and the simple mode.

The fishing reel according to a fifth aspect of the invention is the fishing reel according to any of the first through fourth aspects, further including: first identifying information storage means for storing first identifying information, and the output means outputs to the fishing information display device the first identifying information correlated with the first identifying information. In this case, the first information that is suitable for a variety of reels can be obtained by transmitting the first identifying information for identifying a reel, such as a unique ID code.

The fishing reel according to a sixth aspect of the invention is the fishing reel according to any of the second through fifth aspects, further including first external control means for controlling the fishing information display device.

With the fishing reel, it is possible to connect and control the fishing information display device. Therefore, controls of an operation switch unit for various operations that is provided on the fishing information display device and a display unit for various displays can be performed, for example, with an operation switch unit provided on the fishing reel. Consequently, operability is improved in various operations.

The fishing reel according to a seventh aspect of the invention is the fishing reel according to sixth aspects, wherein the information display means collects second information concerning fishing from the fishing information display device and further enables the first display unit to display the second information. In this case, by enabling the second information to be displayed on the first display unit, a still larger amount of information can be displayed.

The reel according to an eighth aspect of the invention is the fishing reel according to the sixth or seventh aspect, wherein the second information includes at least one of information indicating fish zone, a fish school and a travel direction of the fish school. In this case, the second information concerning fish that is obtained from, for instance, the fish finder can be displayed.

The fishing reel according to an ninth aspect of the invention is the fishing reel according to any of the sixth through eighth aspect, wherein the second information includes at least one of information indicating current position and fishing location. In this case, the second information about positions that is obtained from, for instance, a GPS (geographic positioning system) can be displayed.

The fishing information display device according to a tenth aspect of the invention is a fishing information display device provided externally of a fishing reel that stores first information concerning the reel. The fishing reel outputs the first information to the fishing information display device. The fishing information display device collects second information concerning fishing, and includes: a unit body; a second display unit mounted in the unit body for displaying at least the second information; first acquiring means for acquiring the first information from the fishing reel; second acquiring means for acquiring the second information; second display means for enabling the first information acquired by the first acquiring means to be displayed on the second display unit; and third display means for enabling the second information acquired by the second acquiring means to be displayed on the second display unit.

In the fishing information display device, the first information concerning the reel and the second information concerning fishing are acquired by, for example, the first acquiring means and the second acquiring means, which utilize wireless communication. The first information and the second information acquired are displayed on the second display unit through the second display means and the third display means. Herein, the fishing information display device for displaying the first information is provided separately from the reel. Therefore, for example, the need for providing a display unit in the reel is eliminated, and a large amount of information can be displayed while the size of the reel is kept small. In addition, since the second information concerning fishing is displayed on the second display unit, the second information can be obtained quickly.

The fishing information display device according to an eleventh aspect of the invention is the fishing information display device according to the tenth aspect, wherein the first information is a water depth of a terminal tackle attached to the fishing reel. In this case, the water depth can be displayed as the second display unit.

The fishing information display device according to a twelfth aspect of the invention is the fishing information display device according to the tenth or eleventh aspect, wherein the second information includes at least one of information indicating fish zone, a fish school and a travel direction of the fish school. In this case, the second information concerning fish that is obtained from, for example, the fish finder can be displayed.

The fishing information display device according to a thirteenth aspect of the invention is the fishing information display device according to any of the tenth through twelfth aspects, wherein the second information includes at least one of information indicating current position and fishing location. In this case, the second information about positions that is obtained from the GPS can be displayed.

The fishing information display device according to a fourteenth aspect of the invention is the fishing information display device according to any of the tenth through thirteenth aspects, in which at least one of the second display means and the third display means switches between a detail mode in which the first information and the second information are displayed on the second display unit in a detailed manner, and a simple mode in which the first information and the second information are displayed on the first display unit in a simplified manner. In this case, a display that suits angler's preference is possible by switching between the detail mode and the simple mode.

The fishing information display device according to a fifteenth aspect of the invention is the fishing information display device according to any of the tenth through fourteenth aspects, which further includes: second identifying information storage means for storing second identifying information, and second identifying information transmission means for transmitting the second identifying information; and in which the second information is information related to the second information is transmitted while correlated with the second identifying information by the second identifying information transmission means. In this case, the second information that is suitable for a variety of reels can be obtained by transmitting the second identifying information for identifying a reel, such as a unique ID code.

The fishing information display device according to a sixteenth aspect of the invention is the fishing information display device according to any of the tenth to fifteenth aspects, which further includes first storing means adapted for storing the first information. In this case, the first information and the second information can be stored in a large amount by providing the first storing means.

The fishing information display device according to a seventeenth aspect of the invention is the fishing information display device according to any of the tenth to sixteenth aspects, which further includes first input means through which the first information and the second information can be modified. In this case, since an angler can input the first information and the second information from outside, the information concerning fishing can be changed or added.

The fishing information display device according to an eighteenth aspect of the invention is the fishing information display device according to any of the tenth through seventeenth aspects, further including second external control means for controlling the fishing reel.

The fishing information display device has the second external control means for controlling the fishing reel. Therefore, for example, controls of an operation switch unit provided on the fishing reel, of a display unit for various displays, and of a motor for rotating the spool are possible with an operation switch unit provided for the fishing information display device. Thus, operability in various operations can be improved.

The fishing information display system according to a nineteenth aspect of the invention is a fishing information display system for displaying first information and second information, and including: the fishing reel, collecting means, and a fishing information display device. The fishing reel has a reel body, a line-winding spool rotatably mounted to the reel body, storing means for storing first information concerning the reel, and output means for outputting the first information concerning the reel from the storing means externally. At least one of collecting means for collecting the second information; and the fishing information display device is for acquiring the first information from the fishing reel and for displaying the first information, and for acquiring the second information from the collecting means and for displaying the second information.

The fishing information display system has the fishing reel for outputting the first information externally, the collecting means for collecting the second information, such as a fish finder or a GPS, the fishing information display device for acquiring the first information obtained from the fishing reel and the second information obtained from the collecting means for display. Herein, the information display device is provided externally of the fishing reel, and therefore, a large amount of information can be displayed while the size of the reel is kept small. In addition, since the second information for fishing obtained from the collecting means is displayed on the second display unit, the second information can be obtained quickly.

The fishing information display system according to a twentieth aspect of the invention is the fishing information display system according to the nineteenth aspect, further including coordinating means for coordinating the second information collected by the collecting means. The collecting means has a plurality of collecting devices. The fishing information display device is adapted for acquiring the second information from the coordinating means and displaying the second information. In this case, since the coordinating means that is capable of coordinating the second information collected by the plurality of collecting devices is provided, the second information can be collectively managed.

The fishing information display system according to a twenty first aspect of the invention is the fishing information display system according to the twentieth aspect, wherein the coordinating means further includes a second storing means for storing the second information. In this case, the second information can be stored in a large amount by providing the second storing means.

The fishing information display system according to a twenty second aspect of the invention is the fishing information display system according to the twentieth or twenty first aspect, wherein the coordinating means further includes second information input means for inputting the second information externally. In this case, since the angler can input the second information from outside, the second information can be changed or added.

The fishing information display system according to a twenty third aspect of the invention is the fishing information display system according to any of the twentieth through twenty second aspects, wherein the coordinating means communicates with at least one of the plurality of collecting devices, and the information display device communicates with one of the plurality of collecting devices. In this case, a plurality of types of the second information can be managed, not by enabling the plurality of collecting devices and the information display device to communicate directly, but by providing the coordinating means between the plurality of collecting devices and the information display device.

The fishing information display system according to a twenty fourth aspect of the invention is the fishing information display system according to any of the twentieth through twenty third aspects, wherein the coordinating means further includes information selection means for selecting only one of the plurality of collecting devices. In this case, effective communication is possible because, for example, in cases where it is possible to communicate with a fish finder and a GPS as the plurality of collecting devices, the coordinating means can make selection so as not to communicate with the GPS while it is communicating with the fish finder in actual fishing, and so as not to communicate with the fish finder while it is communicating with the GPS in traveling.

The fishing information display system according to a twenty fifth aspect of the invention is the fishing information display system according to any of the nineteenth through twenty fourth aspects, wherein the fishing reel further includes a first reel control unit operatively connected to the first storing means and the output means; and the fishing information display device further includes a second reel control unit for controlling the fishing reel.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
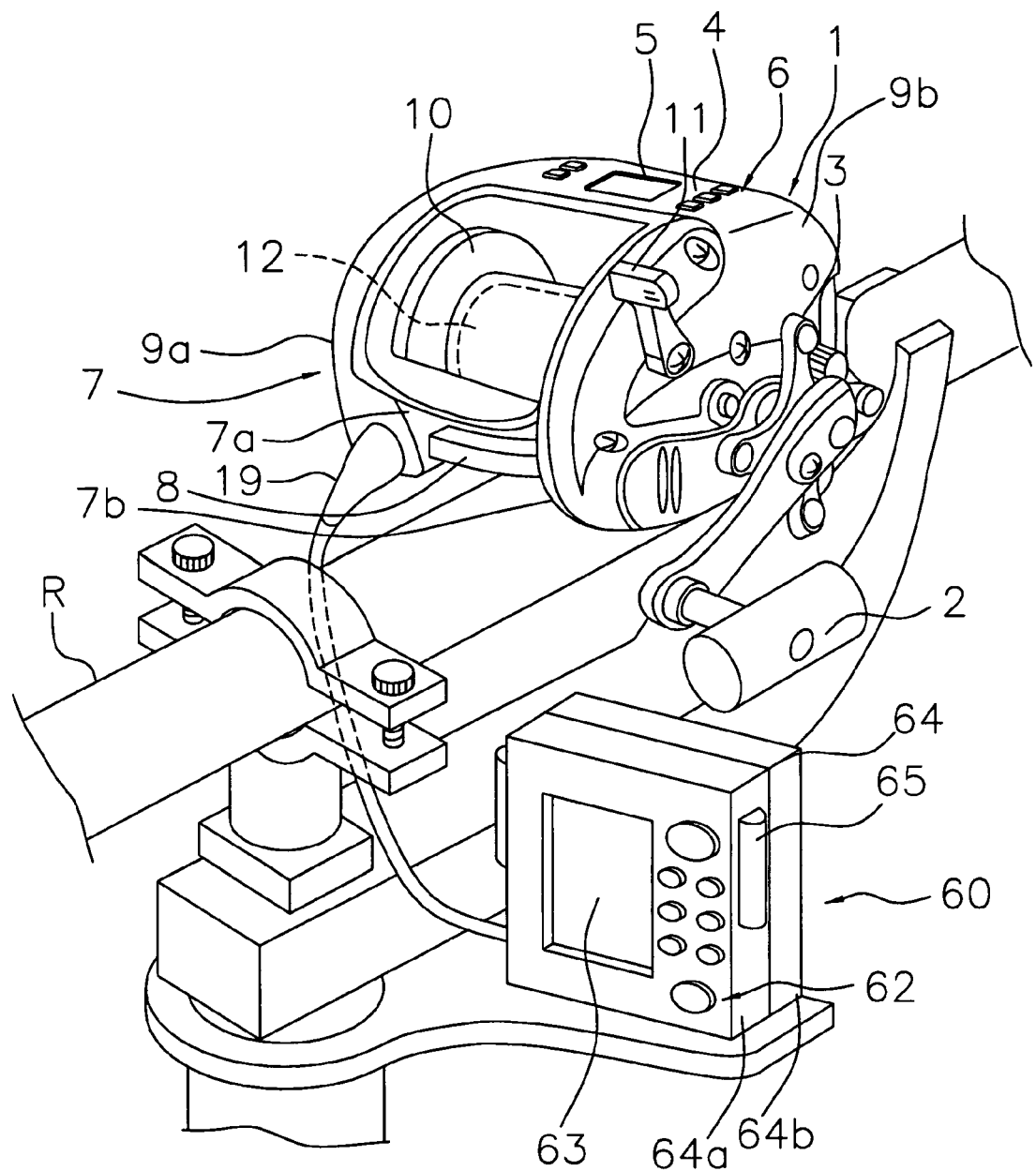
FIG. 1 is a perspective view of an electric reel according to one embodiment of the present invention.

An electric reel adopting one embodiment of the present invention is furnished with, as shown in FIG. 1, a reel body 1 mounted on a fishing rod R, a handle 2 disposed sideways on the reel body 1 for rotating a spool, a star drag 3 disposed on the reel body 1 side of the handle 2 for drag adjustment, and a case member 4 provided above the reel body 1.

The reel body 1 is mounted on the fishing rod R and is provided with a frame 7 including a pair of left and right side plates 7a and 7b and a plurality of linking members 8 for linking them, and left and right side covers 9a and 9b for covering the respective left and right sides of the frame 7. With the side cover 9b that is on the handle 2 side, a rotation shaft (not shown) of the handle 2 is supported rotatably.

In the interior of the reel body 1, a spool 10 connected to the handle 2 is supported rotatably. In the interior of the spool 10, a motor 12 is disposed for driving and rotating the spool 10 in a line-winding direction. On the side face of the side cover 9b that is on the handle 2 side, a clutch lever 11 is disposed for operating a clutch mechanism (not shown). At the rear of the side plate 7a side linking member 8, a reel cord 19 is attached for connecting an external power supply (not shown) and a later-described fishing information display device 60, which is provided separately.

The case member 4 is, as shown in FIG. 1, a case that is made of an aluminum alloy and is arranged above the reel body 1, and the interior space thereof accommodates various electric components. On the upper surface of the case member 4, a first display unit 5 and an operation key unit 6 (an example of first external control means) are provided; the first display unit 5 has a liquid crystal display for displaying, through a display window made of a transparent resin, information concerning the reel such as water depth of terminal tackle and fish zone, with respect to the water surface or the bottom (example of first information). The operation key unit 6 is disposed around the first display unit 5. The operation key unit 6 also functions as switches for carrying out various control operations, such as display control of a later-described second display unit 63 for the fishing information display device 60.

Figure 2:
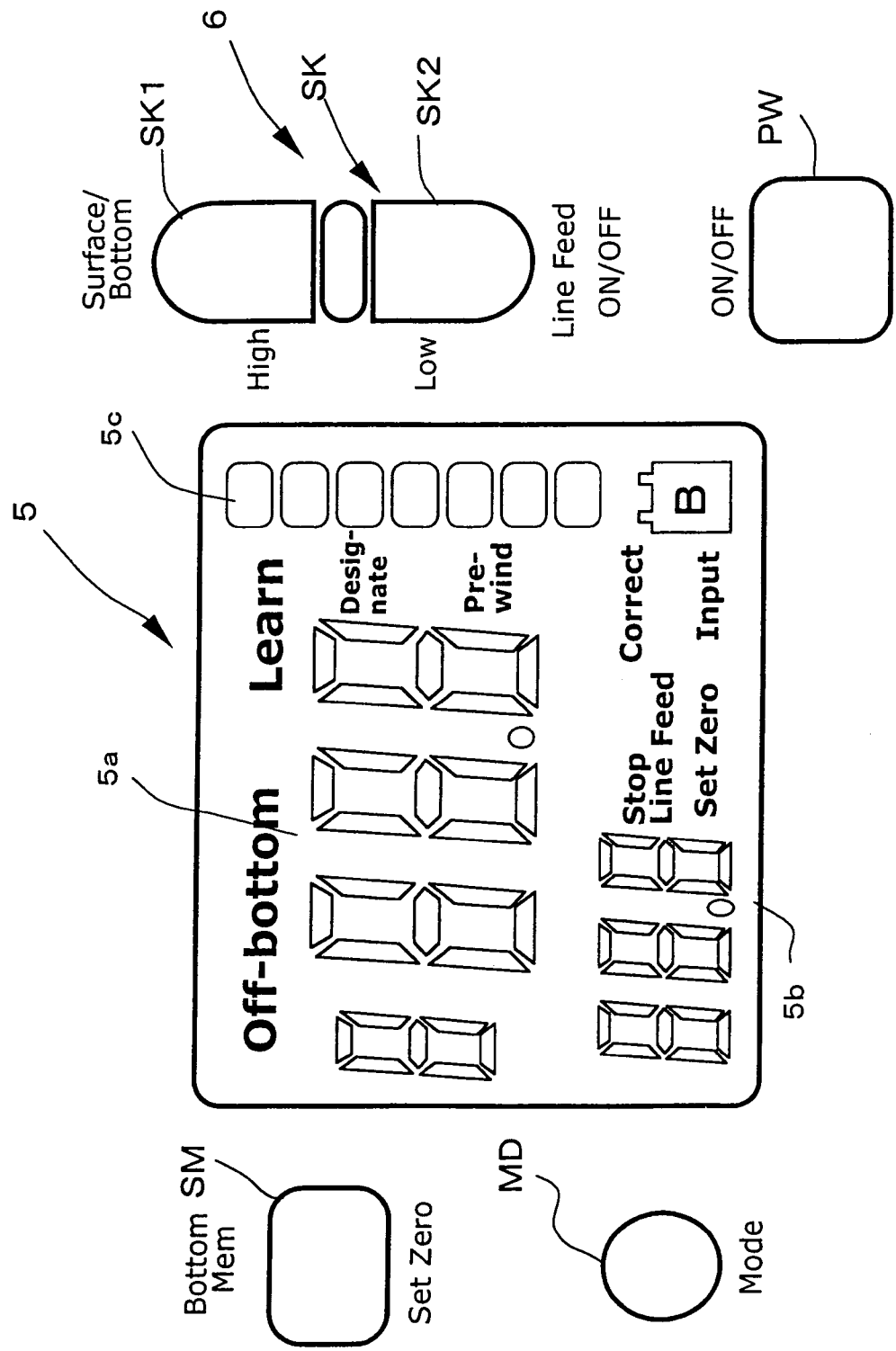
FIG. 2 is a partially enlarged plan view of the standard display of the electric reel according to the embodiment of the present invention.

The first display unit 5 has, as shown in FIG. 2, a water depth display area 5a that is a four-digit seven segment display arranged at its center, a three-digit bottom water depth display area 5b arranged therebelow, and a gear speed display area 5c arranged on the right hand side of the water depth display area 5a as seen in FIG. 2. The first display unit 5 is capable of displaying eight sets of characters, "From-bottom," "Learn," "Designate," "Pre-wind," "Correct," "Input," "Stop Line Feed," and "Set Zero." The word "From-bottom" is displayed when the water depth display mode is in From-bottom. The "From-bottom" mode is a mode in which the water depth of the terminal tackle is displayed with reference to the sea bottom. It should be noted that the water depth of the terminal tackle is normally displayed with reference to the water surface ("Surface" mode). The characters "Learn" through "Input" indicate types of line-winding modes, and when one of them is selected, the characters corresponding to the selected line-winding mode are displayed.

The operation key unit 6 includes "Change Speed" key SK and "Motor" key PW arranged vertically on the right side, in FIG. 2, of the first display unit 5, and "Bottom Memory" key SM and "Mode" key MD arranged vertically on the left side, as seen in FIG. 2.

The Motor key PW is a toggle switch for turning the motor 12 on and off and for increasing the speed of the motor 12 according to ON time.

The Change-Speed key SK is a key for increasing or decreasing the speed of the motor 12 that is being driven, and it is a "see-saw" type switch having two switches (an upper switch SK1 and a lower switch SK2) and a neutral position. When the upper switch SK1 is pressed, the speed increases, whereas when the lower switch SK2 is pressed, the speed decreases. When the upper switch SK1 is kept pressed for a predetermined period of time or longer while the motor 12 is not being driven, the display mode can be switched between "Surface" and "Off-bottom". When the lower switch SK2 is kept pressed for a predetermined period of time or longer, a forced unreeling mode (a mode in which when the line is reeled out, the speed of unreeling is increased by driving the motor 12 with the clutch being disengaged) can be turned on and off.

The Bottom Memory key SM is a switch that is to be pressed when the terminal tackle reaches the bottom, and the water depth at that time is set as a "bottom". When the Bottom Memory key SM is kept pressed for a predetermined period of time or longer, the zero point of water depth display can be set to a new position, for example, when the fishing line breaks.

The Mode key MD is a key for setting five kinds of line-winding modes. For example, the line-winding mode is set as follows; a Learn mode is turned on when it is pressed one time, a Designation mode when pressed two times consecutively, Pre-wind mode three times, a Correction mode four times, and an Input mode five times.

The operation key unit 6 may also be used for display control or the like of the later-described second display unit 63 of the fishing information display device 60. For example, by operating the operation key unit 6, selection of menus displayed on the second display unit 63 is possible.

Figure 3:
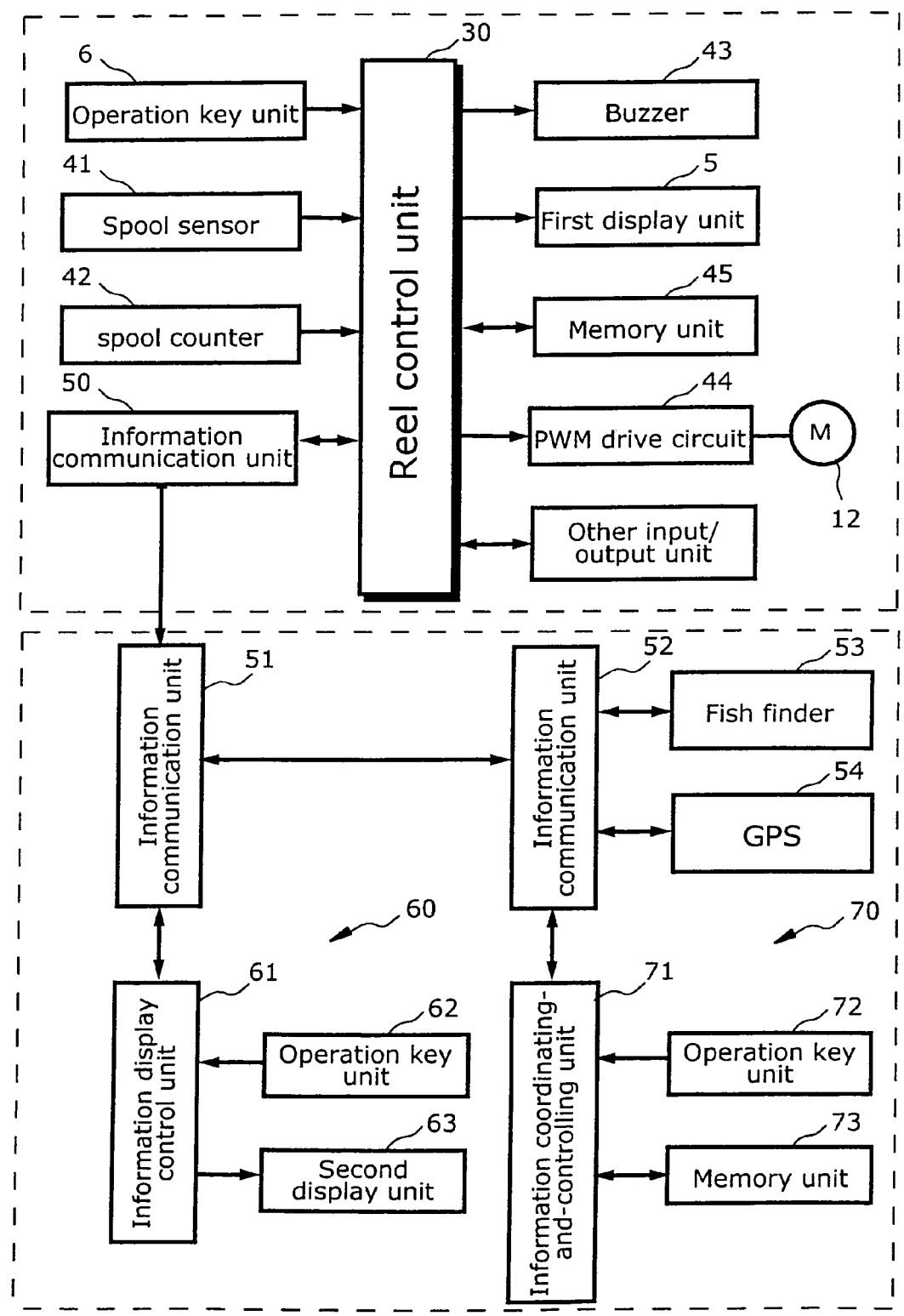
FIG. 3 is a control block diagram of the electric reel according to the embodiment of the present invention.

As shown in FIG. 3, in the interior of the case member 4 is a reel control unit 30, which includes a microcomputer including a CPU, which performs a water depth display control and motor drive control, a RAM (Random Access Memory), a ROM (Read Only Memory), an I/O interface, and so forth. The microcomputer of the reel control unit 30 includes a control program, which controls the reel 1 as discussed below. Operatively connected to the reel control unit 30 in conventional manners are various keys in the operation key unit 6, a spool sensor 41 for detecting rotational positions and directions of the spool 10, and a spool counter 42 in which a count value changes with every predetermined pulse from the spool sensor 41. The sensor and counter used herein may be any conventional ones. The spool sensor 41 and the spool counter 42 are conventional components that are well known in the art. Since the spool censor and spool counter are well known in the art, these structures will not be discussed or illustrated in detail herein.

Also operatively connected to the reel control unit 30 in conventional manners are a buzzer 43 for outputting various alarms, the first display unit 5 for various displays, a memory unit 45 (an example of storing means) for storing various data for performing various displays, a PWM drive circuit 44 including a FET for PWM-driving the motor 12, and other input/output units. Herein, the control unit 30 functions as the first display means. The buzzer 43, the memory unit 45, and the PWM drive circuit 44, used herein are components. The buzzer, the memory unit, the PWM drive circuit are conventional components that are well known in the art. Since the buzzer 43, the memory unit 45, and the PWM drive circuit 44 are well known in the art, these structures will not be discussed or illustrated in detail herein. Further connected to the reel control unit 30 are an information communication unit 50 (an example of output means) for transmitting the first information concerning the reel externally, and for receiving the second information concerning fishing from a fish finder 53 or a GPS 54 (examples of collecting means) through the fishing information display device 60 and an information coordinating device 70. The fish finder GPS are conventional components that are well known in the art. Since the fish finder 53 and the GPS 54 are well known in the art, its structures will not be discussed or illustrated in detail herein. The reel control unit 30 is capable of selectively controlling any of the components operatively coupled thereto in accordance with the control program. It will be apparent to those skilled in the art from this disclosure that the precise structure and algorithms for the reel control unit 30 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The information communication unit 50 is connected to, as shown in FIGS. 1 and 3, an information communication unit 51 (an example of first acquiring means and second acquiring means) that is provided in the fishing information display device 60 via cable communication through the reel cord 19.

The fishing information display device 60 is furnished with, as shown in FIG. 1, a unit body 64, a second display unit 63 that is mounted to the unit body 64 and is adapted for displaying various information, an operation key unit 62 that is disposed around the second display unit 63 and is for various operations, an antenna unit 65 that is disposed on both sides of the unit body 64 and is connected to the information communication unit 51.

The unit body 64 includes, as shown in FIG. 1, a first member 64b that is made of a metal and is for accommodating various electric components, and a second member 64a that is made of a synthetic resin and is for fitting the second display unit 63. The antenna unit 65, which includes a protruding portion made of a metal, is formed on either side of the second member 64a.

In the interior of the fishing information display device 60, an information display control unit 61 (an example of second display means and third display means) is provided. The information display control unit 61 includes a microcomputer including a CPU which controls the display, a RAM, a ROM, an I/O interface, and so forth, as shown in FIG. 3. The information display control unit 61 is operatively connected to the information communication unit 51, various keys in the operation key unit 62, and the second display unit 63 for performing various displays.

The information communication unit 51 can, as shown in FIG. 3, communicate with the information communication unit 50 that is provided in the reel through a cable. The information communication unit 51 can also communicate wirelessly with an information communication unit 52 provided in the information coordinating device 70. As shown in FIG. 1, the reel and the fishing information display device 60 are linked through the reel cord 19, which is of socket type, so that electric power and information can be sent to and received from each other. The fishing information display device 60 and an external power supply, which is not shown in the figures, are linked with a code with an alligator type clip, through which electric power is supplied. The fishing information display device 60 and the information coordinating device 70 are connected using a wireless communication technology such as Bluetooth or Wi-Fi. Bi-directional communications are possible between the reel and the fishing information display device 60, as well as between the fishing information display device 60 and the information coordinating device 70.

The operation key unit 62 has switches for performing various controls such as display control of the second display unit 63. The operation key unit 62 can control not only the control of the fishing information display device 60 side devices but also the reel side devices. For example, the fishing-depth-zone-stoppage and rotation of the motor 12 can be controlled by operating the operation key unit 62.

Figure 7:
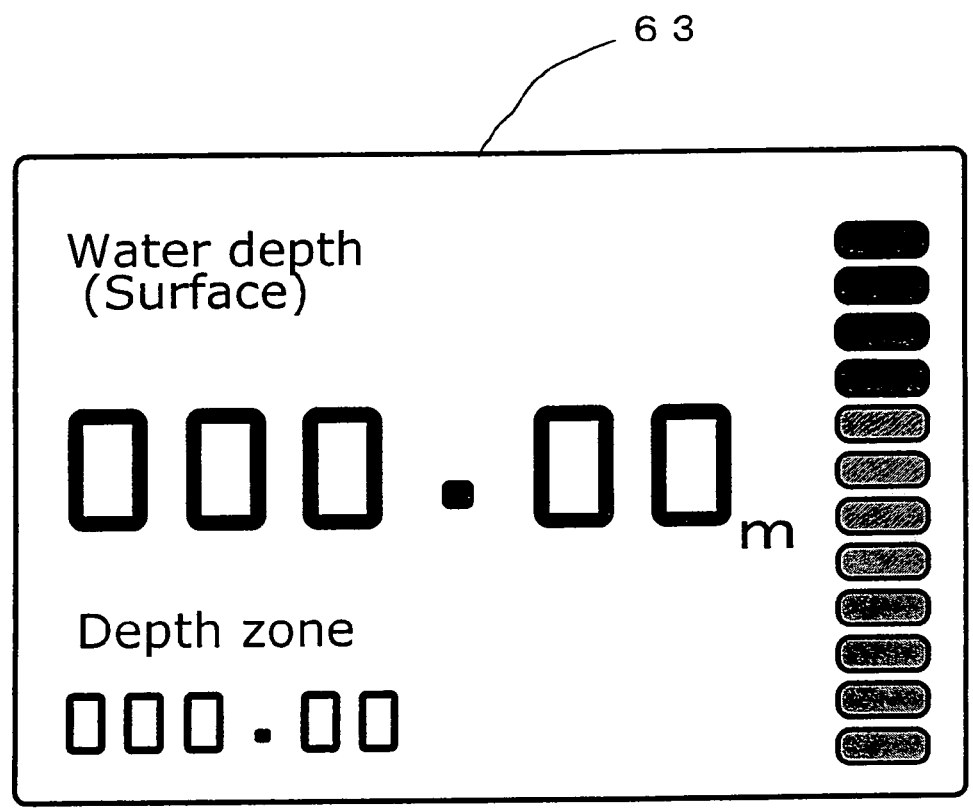
FIG. 7 is a view of an example of display on a fishing information display device according to the embodiment of the present invention.
Figure 8:
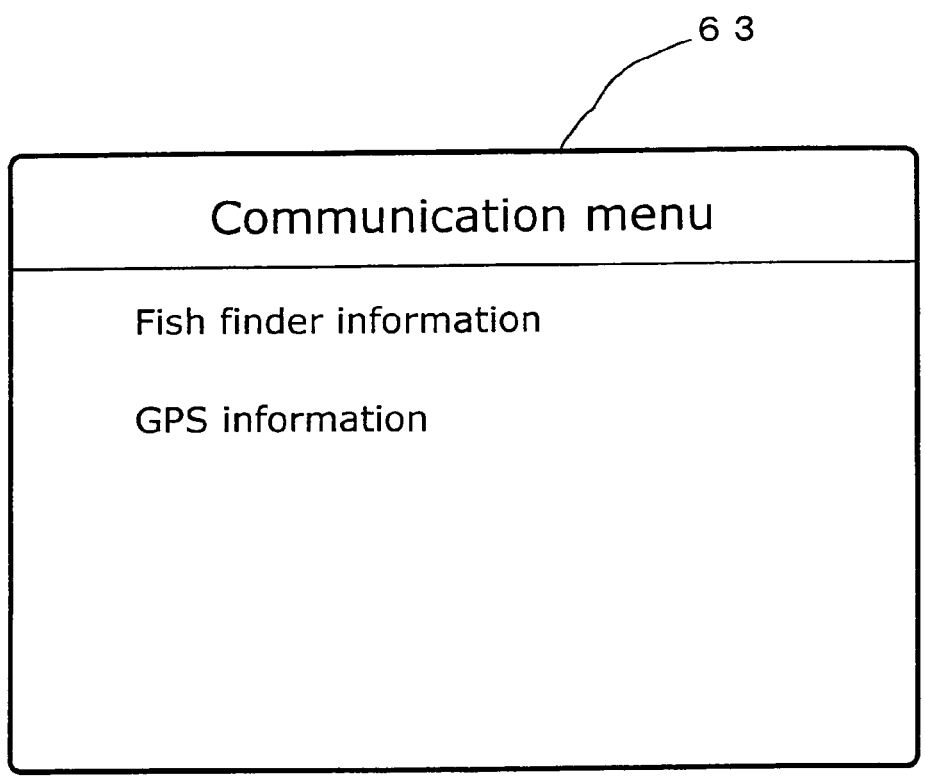
FIG. 8 is a view of an example of display on the fishing information display device in communication mode according to the embodiment of the present invention.
Figure 9:
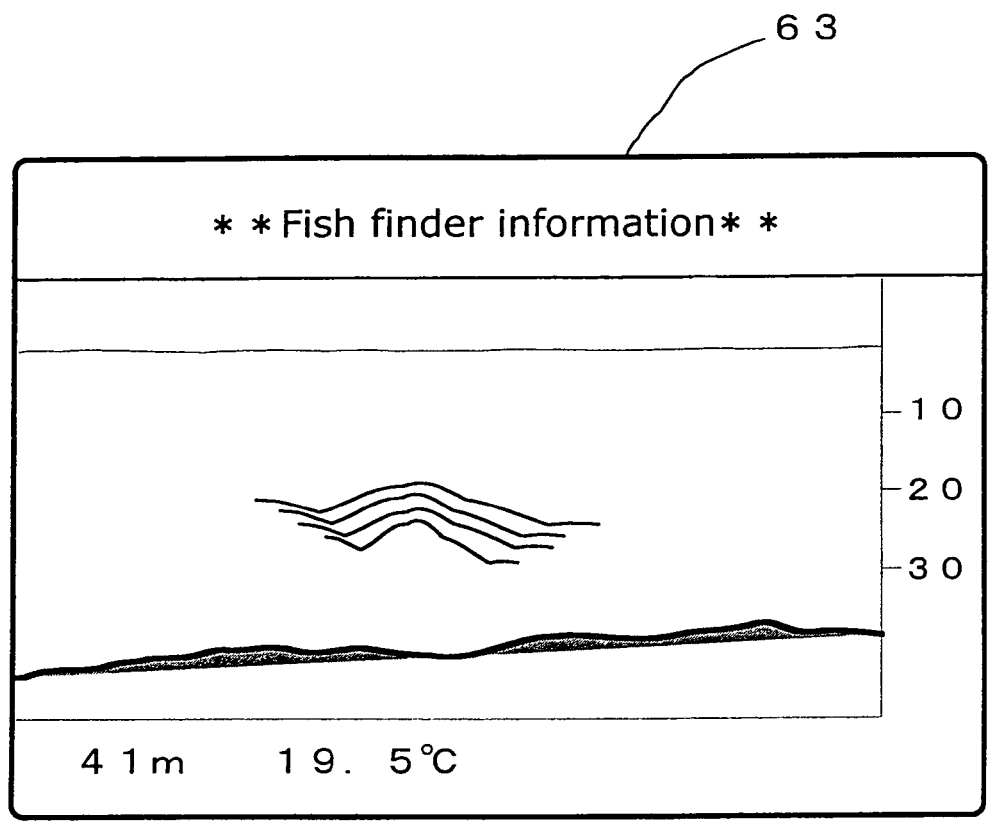
FIG. 9 is a view of an example of display on the fishing information display device in fishing mode according to the embodiment of the present invention.

The second display unit 63 is, as shown in FIGS. 7 to 9, a multi-color TFT liquid crystal display, which can display the first information which concerns the reel, and the second information which concerns fishing. The first information has been obtained from the reel. The second information has been obtained from the fish finder 53 and the GPS 54 through the information coordinating device 70. The first and second information can be displayed with one being superimposed over the other. For example, fishing line load data, line length data, or the like obtained from the reel can be displayed after being corrected based on the data from the fish finder 53. Also, a history of the water depth display can be displayed in graphical representation while the information from the fish finder 53 and the information from the reel are being displayed in a combination screen.

The information coordinating device 70 is connected to the fish finder 53 and the GPS 54, as shown in FIG. 3. It coordinates and stores the information obtained from the fish finder 53 and the GPS 54, and is capable of bi-directional communication with the fishing information display device 60. In the interior of the information coordinating device 70, an information coordinating-and-controlling unit 71 is accommodated which includes a microcomputer including a CPU which performs display control, a RAM, a ROM, an I/O interface, and so forth, as shown in FIG. 3. The information communication unit 52, various keys in an operation key unit 72, and a memory unit 73 for storing various information are operatively connected to the information coordinating-and-controlling unit 71. The information coordinating-and-controlling unit 71 is capable of selectively controlling any of the components operatively connected thereto in accordance with the control program. It will be apparent to those skilled in the art from this disclosure that the precise structure and algorithms for the information coordinating-and-controlling unit 71 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The information communication unit 52 can communicate wirelessly with the information communication unit 51, which is provided for the fishing information display device 60 as shown in FIG. 3. The information communication unit 52 can also communicate with the fish finder 53 and the GPS 54 through a cable.

The operation key unit 72 is adapted for inputting information that a boatman wishes to convey, for example, information for instructing lowering of the terminal tackle. The input information is stored in the memory unit 73, and is transmitted to the fishing information display device 60 on which the input information is displayed. Herein, since contents that have been conveyed by the boatman through a microphone are displayed on the fishing information display device 60, transmission of the information is made easier and more reliable.

Next, major control processes for the reel that are carried out by the reel control unit 30 are described with reference to control flowcharts of FIGS. 4-6.

Figure 4:
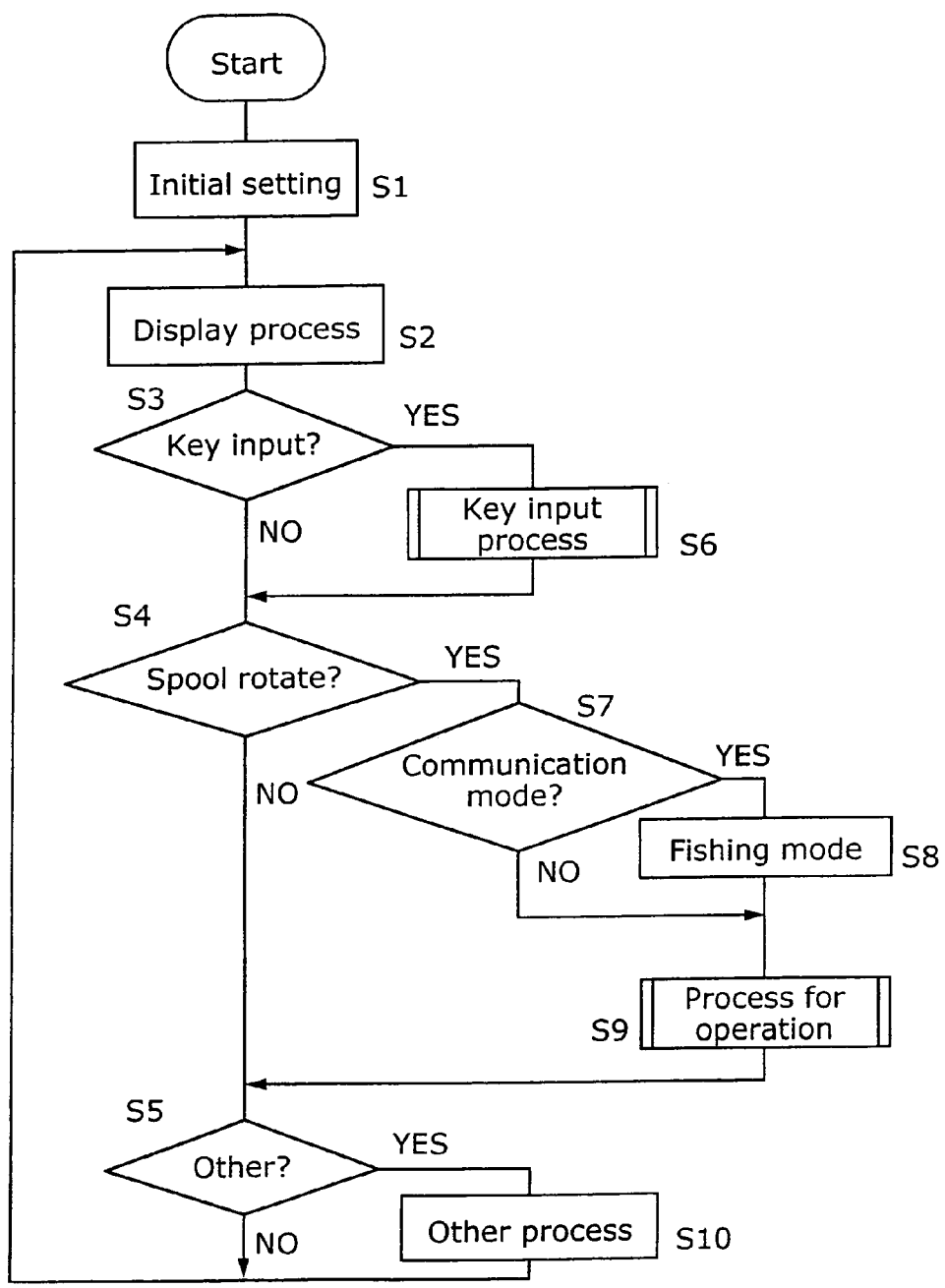
FIG. 4 is a flowchart illustrating the process in a main routine of the electric reel according to the embodiment of the present invention.

When an external power supply is connected to the electric reel, an initial configuration is set in step S1 shown in FIG. 4. More specifically, various flags are reset, and the display mode is reset to "Fishing" mode.

In step S2, a display process is executed for the first display unit 5 and the second display unit 63. More specifically, if the display mode of the second display unit 63 is in the Fishing mode, the water depth and speed that have been computed are displayed, as shown in FIG. 7. If the second display unit 63 is in "Communication" mode, an initial display for the Communication mode shown in FIG. 8 is displayed. In the initial display for the Communication mode, two menu items "Fish Finder Information" and "GPS Information" are displayed as the communication menu. These two types of information concerning fishing can be selected by operating the operation key unit 6.

Herein, the item "Fish Finder Information" is for processing the second information concerning fishing that is obtained from the fish finder 53. The item "GPS information" is for displaying positional information, which is the second information concerning fishing that is obtained from the GPS 54. Thus, as shown in FIG. 9, information concerning fishing regarding a fishing location, such as information concerning fish schools or water temperature, can be obtained through graphics and/or numerical values.

In step S3, it is determined whether there has been a key input interruption through operation of the various keys on the operation key unit 6. If there has been a key input in step S3, the process flow proceeds to step S6 to perform the process required by the key operation.

In step S4, it is determined whether the spool 10 has rotated. The determination is made based on the output from the spool sensor 41. If it is determined that the spool 10 is rotating, the process flow proceeds from step S4 to step S7. In step S7, it is determined whether the Communication mode is on, and if the Communication mode is on, the process flow proceeds to step S8 to switch the display mode from the Communication mode to the Fishing mode. If the Communication mode is off and if the process of step S8 finishes, the process flow proceeds to step S9 processes corresponding to the operation mode (Fishing mode) are performed.

In step S5, it is determined whether there have been any other instructions. If other instructions are made, the process flow proceeds to step S10 to execute other processes corresponding to the instructions.

Figure 5:
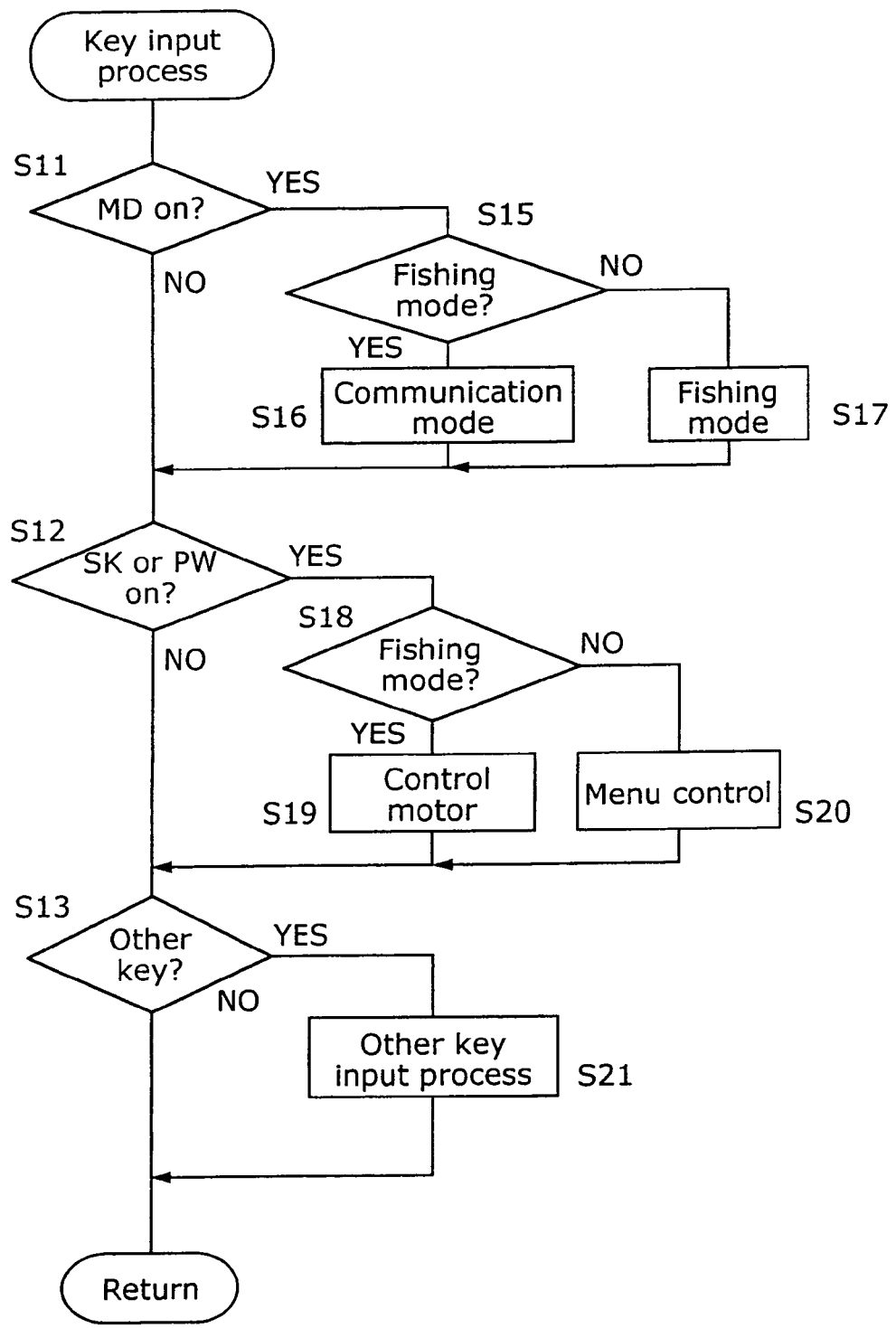
FIG. 5 is a flowchart illustrating the content of a key input process of the electric reel according to the embodiment of the present invention.

In the key input process of step S6, it is determined whether the Mode key MD has been operated in step S11 shown in FIG. 5. In step S12, it is determined whether the Change-Speed key SK or the Motor key has been operated. In step S13, it is determined whether other keys have been operated.

If it is determined that the Mode key MD has been operated, the process flow proceeds from step S11 to step S15 to determine whether the display mode is in the Fishing mode. If the Fishing mode is on, the process flow proceeds to step S16 to switch the display mode to the Communication mode. If the Communication mode is on, the process flow proceeds to step S17 to switch the display mode to the Fishing mode. When the display mode is switched to the Communication mode, the information communication unit 50 is controlled so that communication with the fishing information display device 60 is possible, and an initial display shown in FIG. 8 is presented in the display processing at step S2 shown in FIG. 4.

If the Change-Speed key SK or the Motor key is operated, the process flow proceeds from step S12 to step S18. In step S18, it is determined whether the display mode is in the fishing mode. If the display mode is determined to be in the fishing mode, the process flow proceeds to step S19 to execute a motor control process according to the operated key, which is either the Change-Speed key SK or the Motor key. For example, if the Motor key is press-operated, the motor 12 is turned on or off. In the case of the Change-Speed key SK, if the upper switch SK1 is press-operated, an accelerating process is executed, while if the lower switch SK2 is press-operated, a decelerating process is executed.

In the case of the Communication mode, the process flow proceeds to step S20 to execute a menu control process, in which menus are controlled by cursor movement.

In the menu control process of step S20, a cursor on the first display unit 5 is moved by operating the upper switch SK1 or the lower switch SK2 shown in FIG. 2, and menu selection is made by pressing the center switch, which is located between the upper switch SK1 and the lower switch SK2. For example, in the communication menu shown in FIG. 8, when the upper switch SK1 or the lower switch SK2 is pressed, a cursor moves vertically between menu items. The menu item is selected by press-operation of the center switch, whereafter information is received from the information communication unit 50, and the process flow moves to the next process. Then, when the cursor is moved vertically by operating the upper switch SK1 or the lower switch SK2 and some selection operations are performed, the second information as shown in FIG. 9 concerning fishing at the fishing location obtained from the fish finder 53 is displayed.

Figure 6:
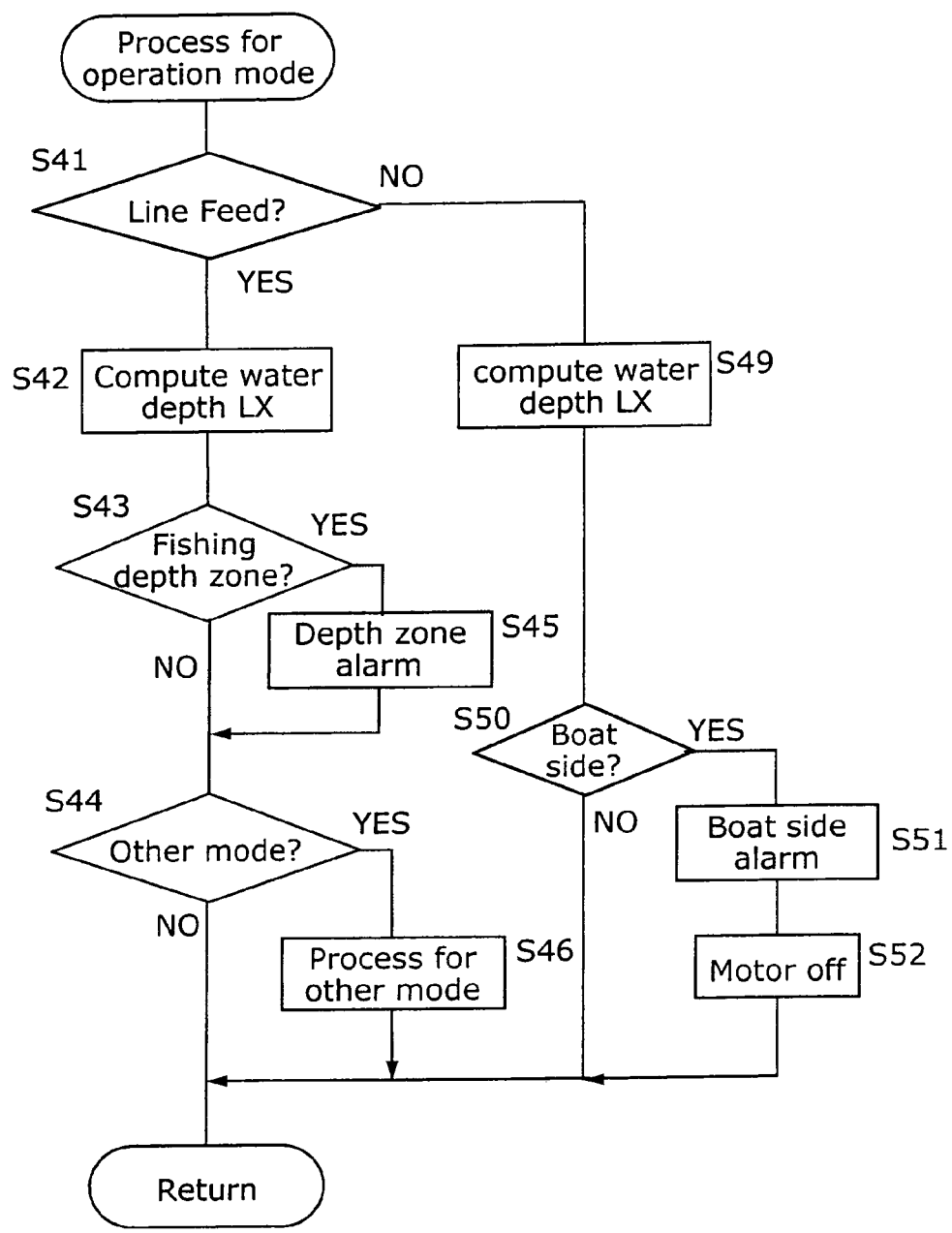
FIG. 6 is a flowchart illustrating the contents of processes in various operation modes of the electric reel according to the embodiment of the present invention.

In each of the processes of respective operation modes in step S9, it is determined in step S41 shown in FIG. 6 whether rotational direction of the spool 10 is in a line-Line Feeding direction or not. The judgment is made based on which of the lead switches of the spool sensor 41 emitted a pulse earlier. If it is determined that the rotational direction of the spool 10 is in a line-Line Feeding direction, the process flow proceeds from step S41 to step S42.

In step S42, data stored in the memory unit 45 are read out to compute the line length that has been reeled out, based on a count value indicated by the spool counter 42. The spool counter 42 decreases with every pulse from the spool sensor 41 in a predetermined timing. A water depth LX is then computed from the line length. The water depth LX thus obtained is displayed in the display process of step S2. Examples of the screens shown on the first display unit 5 and on the second display unit 6 are depicted in FIGS. 2 and 7, respectively. In the processes for the respective operation modes in the fishing mode, the first display unit 5 and the second display unit 63 display such information as water depth of the terminal tackle, fish zone, speed of the spool 10, and the like.

In step S43, it is determined whether the obtained water depth LX matches the fish zone, that is, whether the terminal tackle has reached the depth zone or not. If the terminal tackle has not reached the depth zone yet, the process flow proceeds to step S44.

In step S44, it is determined whether any other fishing mode is on. If no other fishing mode is on, the processes for the respective operation modes are terminated and the process flow returns to the main routine.

If the water depth matches the fish zone, the process flow proceeds from step S43 to step S45, and the buzzer 43 is sounded to report that the terminal tackle has reached the depth zone. If any other fishing mode is on, the process flow proceeds from step S44 to step S46, in order to execute other mode that is turned on.

If it is determined that the rotation of the spool 10 is in the line winding direction, the process flow proceeds from step S41 to step S49. In step S49, data stored in the memory unit 45 are read out and the line length that has been reeled out is computed according to the count value indicated by the spool counter 42, which increases with every pulse from the spool sensor 41 in a predetermined timing. The water depth LX is further computed from the line length. The water depth LX thus obtained is also displayed in the display process at step S2.

In step S50, it is determined whether the water depth matches a boat side stoppage position. If the line has not yet been reeled in up to the boat side stop position, the process flow returns to the main routine.

If the boat side stoppage position is reached, the process flow proceeds from step S50 to step S51. In step S51, the buzzer 43 is sounded to alert that the terminal tackle is at the boat side. In step S44, the motor 12 is turned off. In this manner, in catching a fish, the fish can be positioned such that it is easily taken in. The boat side stoppage position is set, for example, when the water depth is 6 m or less and the spool 10 has been stopped for a predetermined period of time or longer.

In this electric reel, the fishing information display device 60 is enabled to display the first information obtained from the reel and the second information obtained from the fish finder 53 and the GPS 54 through the information coordinating device 70. In addition, the fishing information display device 60 can be controlled with the operation key unit 6 of the electric reel, and the electric reel can be controlled with the operation key unit 62 of the fishing information display device 60.

Herein, the electric reel is adapted for outputting the first information concerning the reel to outside. Therefore, by displaying the first information on the fishing information display device 60 that is provided separately from the electric reel, a large amount of information can be displayed while the size of the reel is kept small. In addition, since the second information concerning fishing is displayed on the fishing information display device 60, the second information can be obtained quickly.

OTHER EMBODIMENTS

In the foregoing embodiment, the fish finder 53 and the GPS 54 are shown as examples of information collecting means on a fishing boat. However, when the fishing boat has a function of collecting information via the Internet, it is possible to employ a configuration such that the information obtained via the Internet can be displayed. Similarly, when the fishing boat is enabled to collect topographical information of the sea bottom or the like, it is possible to employ a configuration such that the obtained topographical information can be displayed. The information may be digitized, high-density information.

In the foregoing embodiment, an electric reel was taken as an example of the fishing reel, but the invention is not limited thereto and may be applied to a hand-winding counter reel or the like.

It is possible to further provide identifying information storage means for holding a unique ID code (identifying information) that specifies a reel, and configure the information communication unit 50 to transmit the ID code to the fishing information display device 60. Alternatively, it is possible to provide identifying information for the fishing information display device 70, and configure the information communication unit 51 to transmit the ID code to the fishing reel. In this case, the information concerning fishing can be made up of information that is related to the ID code sent by the information transmitting means. This way, the information concerning fishing that suits for a variety of reels can be received through bi-directional communications by sending the unique ID code specifying the reel.

Figure 11:
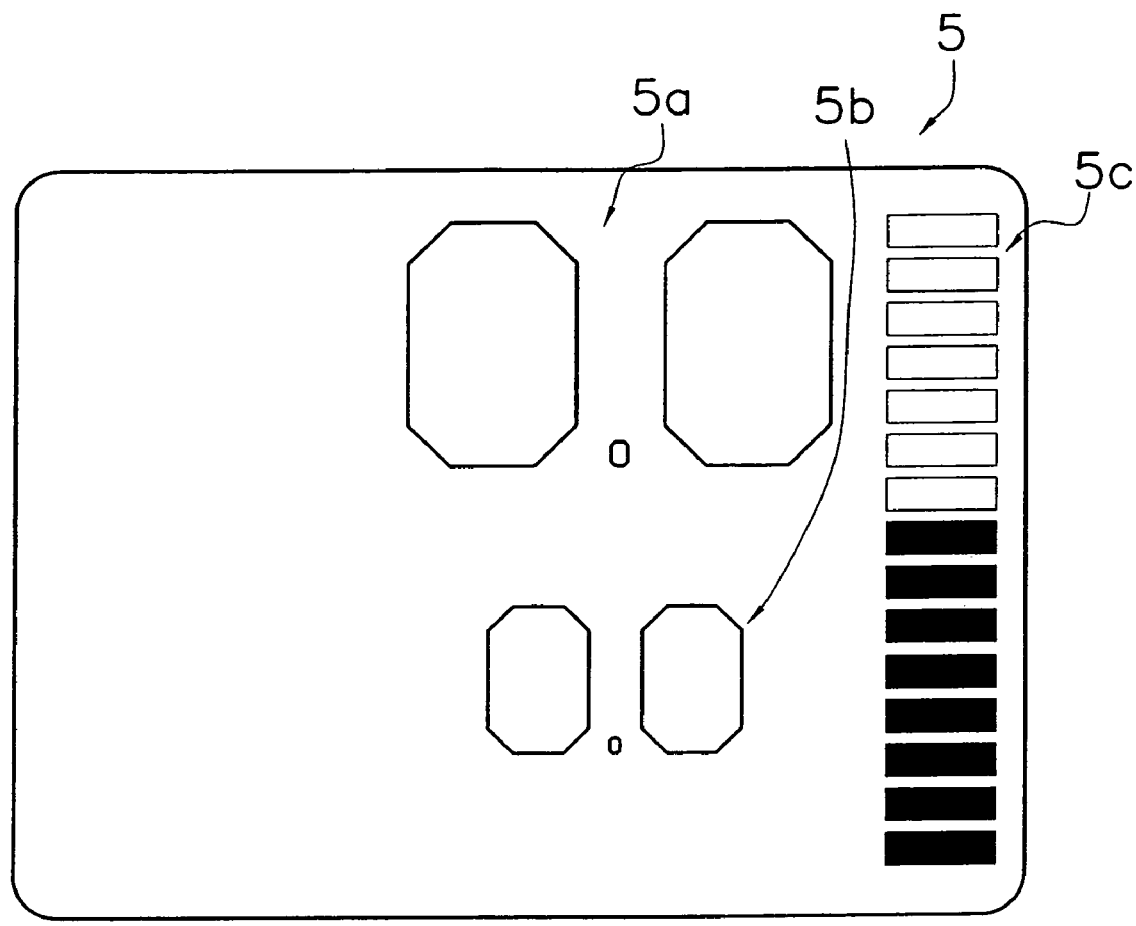
FIG. 11 is a partially enlarged plan view of the simplified display of the electric reel according to still another embodiment of the present invention.

The first display unit 5 and the second display unit 63 may be switchable between a detailed standard display screen that displays all of the first and second information in a detailed manner and a simple display screen that shows the items of the first and second information in a simplified manner. For instance, in the case of the first display unit 5, the simplified screen shown in FIG. 11 only shows the water depth display area 5a, the three-digit bottom water depth display area 5b, and the gear speed display area 5c. In other words, the simplified screen shows fewer items than those shown in the standard display depicted in FIG. 2. Accordingly, the simplified screen shows the water depth display area 5a and the three-digit bottom water depth display area 5b in larger fonts than those in the standard display.

Ways of connecting between the electric reel and the fishing information display device 60, and ways of connecting between the fishing information display device 60 and the information coordinating device 70 are not limited to the foregoing embodiment, but may be any combinations of cable communications and wireless communications. Also, the method of wireless communication is not limited to such wireless communication technology as Bluetooth wireless technology or Wi-Fi radio technology, but infrared communications and other communication protocols may be adopted. Further, the information coordinating device 70 may be eliminated and the fish finder 53 and the GPS 54 may be directly connected to the fishing information display device 60. Also, although a plurality of terminals, namely the fish finder 53 and the GPS 54, were described as being connected as information collecting terminals in the afore-described embodiment, this is not meant to be restrictive and only one of these terminals may be connected.

In the embodiment, the fishing information display device 60 is supplied with power from an external power supply, but power may be supplied by an internal battery. In addition, although the electric reel and the fishing information display device 60 are described as being connected by the reel cord 19 in the above-described embodiment, the electric reel and the external power supply may also be directly connected. Further, the shape of the connector for the code is not limited to the socket type or the alligator type.

In the foregoing embodiment, the fishing information display device 60 is provided externally of, and spaced from the electric reel, but it may be configured so that the fishing information display device can be detachably mounted on a front or an upper portion of the case member 4 of the electric reel. In addition, the fishing information display device 60 may be provided with an openable and closable cover member that covers the second display unit 63, for shielding from external light. In this case, visibility of the second display unit 63 is improved and the surface of the second display unit 63 is protected when the cover member is closed.

In the foregoing embodiment, the first information and the second information are displayed on the second display unit 63 of the fishing information display device 60, but they may be displayed on the first display unit 5 of the electric reel.

In the foregoing embodiment, the fishing information display device 60 can be controlled with the operation key unit 6 of the electric reel and the electric reel can be controlled with the operation key unit 62 of the fishing information display device 60. However, the control need not be bi-directional; it is possible to employ a configuration in which control of only one of the directions is possible.

Figure 10:
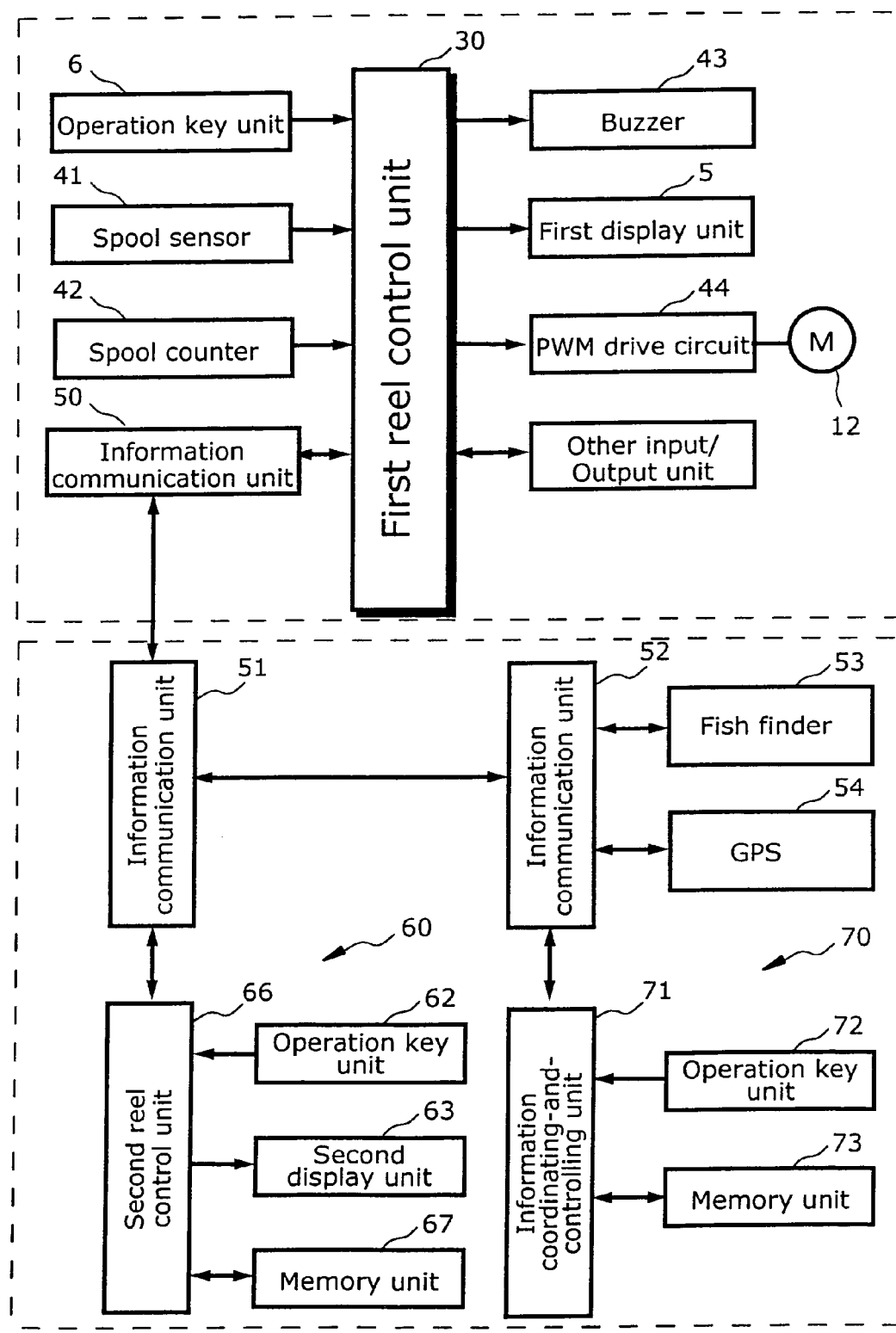
FIG. 10 is a control block diagram of the electric reel according to another embodiment of the present invention t.

It is also possible, as shown in FIG. 10, to employ a configuration in a first reel control unit 31, which is provided on a side of the reel and is capable of controlling one part of the reel, and a second reel control unit 66, which is provided on a side of the fishing information display device 60 and is capable of controlling the other part of the reel. Connected to the first reel control unit 31 is a motor 12 via a PWM driving circuit 44, while various keys of the operational key unit 62, the second display unit 63, and the memory unit for storing various data are connected to the second reel control unit 66.

In this embodiment, the fisherman operates the operational key unit 62 of the fishing information display device 60 based on various data such as a plurality of inducing data stored in the memory unit 67. In this manner, it is possible to conduct controls such as the fish zone stoppage function, the inducing function, and the automatic dangling function, which are reel-controlling functions, via the information communication unit 51, the information communication unit 50, and the first reel control unit 31. In this case, when the fishing information display device 60 is not connected to the reel, it is possible to conduct only minimum-necessary functions such as rotational control of the motor 12. On the other hand, when the fishing information display device 60 is connected to the reel, it is possible to conduct additional controls using the second reel control unit 66 of the fishing information display device 60. Therefore, it is possible to simplify the structure of the reel control and improve the operability of various operations. It is also possible to expand the functions of only the information display device side incrementally, without having to expand the reel.

Although the memory unit 45 is connected to the reel control unit 30 on the reel side in the above-describe embodiment, the memory unit 67 can alternatively be connected to the second reel unit 66 on the fishing information display unit 60. In this manner, it is possible to simplify the structure of the reel, and store many data in the memory unit 67 of the fishing information display device 67.

According to one aspect of the present invention, an output means adapted for outputting the first information concerning the reel is provided externally. Therefore, a large amount of information can be displayed while the size of the reel is kept small. In addition, since the second information concerning fishing is displayed on the second display unit, the second information can be obtained quickly.

According to another aspect of the present invention, the fishing reel has a first external control means adapted for controlling a fishing information display device used for the reel. Therefore, operability of the reel is improved in various operations.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Applications Nos. 2002-285587, 2002-285588, 20023-101425. The entire disclosure of Japanese Patent Applications Nos. 2002-285587, 2002-285588, 20023-101425 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A fishing reel operatively connected to a fishing information display device including an image display member, an information communication member, and an information display control unit operatively coupled to the information communication member and configured to produce a first reel control signal and to superimpose and display on the image display member the first information and a second information produced by a fish-finder, the fishing reel comprising:
   a reel body connected to a fishing rod;
   a line-winding spool rotatably mounted to the reel body;
   a motor arranged to drive the spool;
   a reel display member configured to display the first information;
   a reel control unit configured to produce the first information and a second reel control signal; the reel control unit being configured to control the motor and the reel display member using the first information, the first reel control signal and the second record control signal;
   a reel storage member configured to store the first information and the second reel control signal; and
   a reel communication member operatively coupled to the reel control unit, the reel communication member being configured to transmit the first information and receive the first reel control signal to operate the fishing reel.

2. The fishing reel according to claim 1, wherein the second reel control signal includes rotational control of the motor.

3. The fishing reel according to claim 1, further comprising a water depth measuring device configured to measure water depth of a terminal tackle attached to a fishing line wound around the spool, wherein
   the first information includes the water depth measured by the water depth measuring device.

4. The fishing reel according to claim 3, wherein
   the water depth measuring device is configured to measure and compute the length of a fishing line that is reeled-out by counting spool rotations.

5. The fishing reel according to claim 1, wherein
the reel control unit is configured to switch an image on the reel display member between a detail mode in which the first information is displayed on the reel display member in a detailed manner, and a simple mode in which the first information is displayed on the reel display member in a simplified manner.

6. The fishing reel according to claim 1, wherein
the reel control unit is configured to receive the second information and to enable the reel display member to display the second information.

7. The fishing reel according to claim 1, wherein
the second information includes information of at least one of a fish zone, a school of fish, and a travel direction of the school of fish.

8. The fishing reel according to claim 1, wherein
the second information includes information of at least one of a current position and a fishing location.

* * * * *